March 9, 1954  R. K. WELLMAN  2,671,887
CONTINUOUS ELECTRICAL OUTLET
Filed March 19, 1951
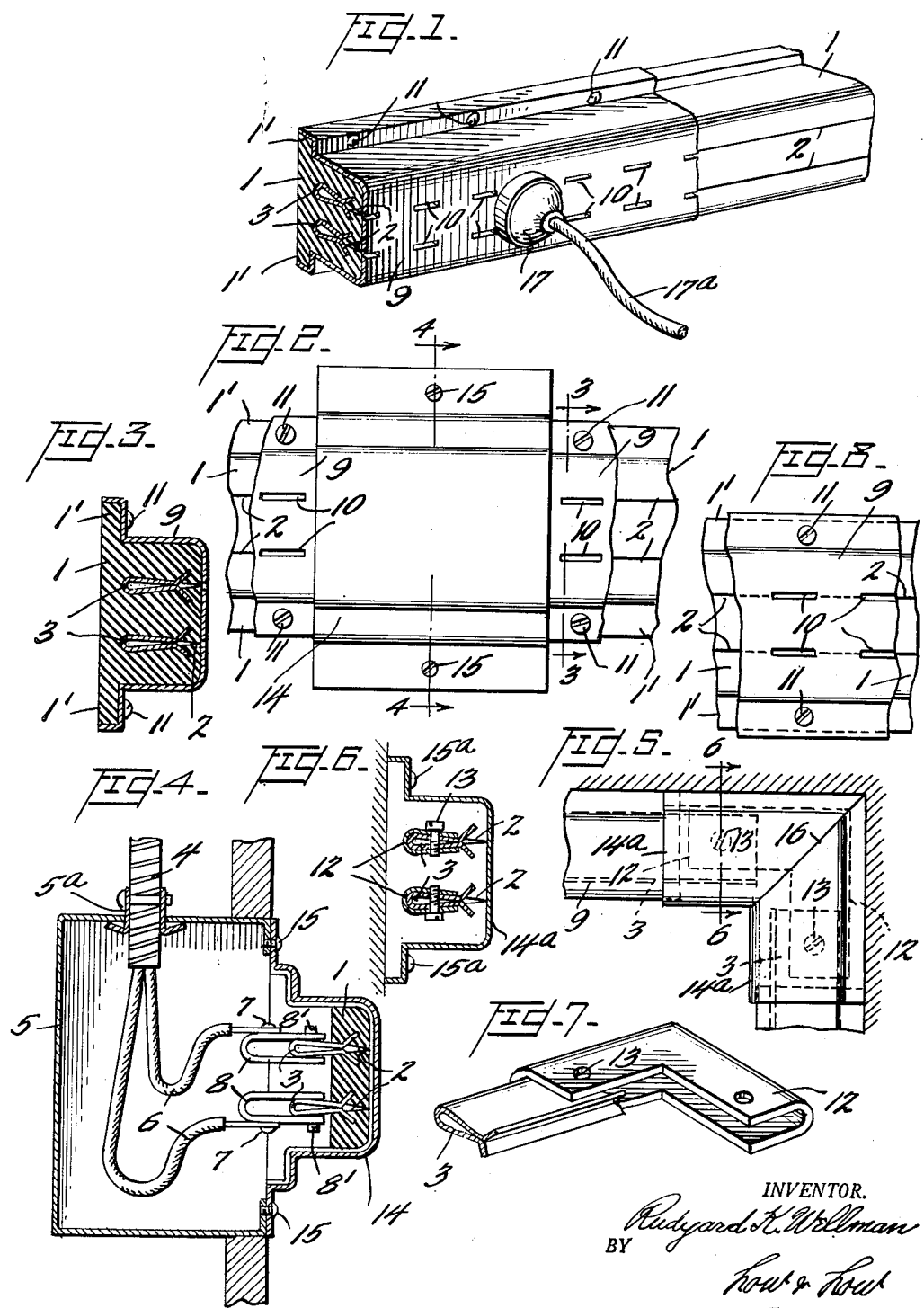
INVENTOR.
Rudyard K. Wellman
BY
Howl & Howl
ATTORNEYS.

Patented Mar. 9, 1954

2,671,887

UNITED STATES PATENT OFFICE 2,671,887

CONTINUOUS ELECTRICAL OUTLET

Rudyard K. Wellman, St. Clair Shores, Mich.

Application March 19, 1951, Serial No. 216,359

2 Claims. (Cl. 339—22)

This invention relates to a continuous electrical outlet for supplying current for utilities in homes, stores, factories and the like.

One object of the invention is the provision of such an outlet that is safe and effective under all ordinary conditions of use.

Another object is the provision of a continuous electrical outlet whose conducting elements are protected from accidental contact.

A further object is the provision of such an outlet that may become part of the wall trim of a room.

Another object is the provision of a cover for a continuous electrical outlet affording spaced points of access to the outlet.

Another object is the provision of a cover for an outlet box or a corner connection of meeting sections of the continuous electric outlet, to conceal and protect connected parts.

Numerous other objects and advantages of the invention will be apparent as it is better understood from the following description which, taken in connection with the accompanying drawings, discloses a preferred embodiment thereof.

In said drawings:

Fig. 1 is a front perspective view of a section of the outlet with the cover applied.

Fig. 2 is an enlarged front elevational view of a portion of outlet section, and showing a strap or plate member for attaching the same to a wall or vertical support, or to an electrical outlet box.

Fig. 3 is a vertical sectional view of the outlet and cover, taken on line 3—3 of Fig. 2.

Fig. 4 is a cross-sectional view of an outlet box set in the wall of a building, taken on line 4—4 of Fig. 2, showing a portion of the supply cable and the manner of attachment of its leads to the conducting elements of the continuous outlet.

Fig. 5 is a top plan view of an angular section of the continuous outlet illustrating how it is joined at an "inside" corner of a room so that its elements are electrically continuous.

Fig. 6 is a vertical sectional view taken on line 6—6 of Fig. 5.

Fig. 7 is a top perspective view of a corner junction piece such as may be used to join the conducting elements at a corner of a room.

Fig. 8 is a front elevational view of the cover plate for the outlet member, or corner connections thereof, and illustrating portions of the outlet member normally protected and concealed by said cover plate.

Referring to the drawings:

The body of the continuous outlet is indicated at 1 and is composed of insulating material, such as rubber, and is sufficiently yielding to insure the normal closing of the integral slits 2, so as to exclude dust and other foreign matter, and so as to prevent accidental contact with the metal conducting elements 3 (Fig. 4) and possible injury as a result thereof. The conducting elements 3 may be formed by bending opposite portions of a strip of metal on its longitudinal center through angles of approximately 90° in such a manner that the material will contact at its opposite side edges. The opposite terminal edges of the thus bent strip are then each bent outwardly to form a pair of outwardly directed flanges. These flanges will press into the rubber material 1 as clearly shown in Figures 1 and 3, thereby preventing the removal of these conducting elements 3 from the slits 2 in the rubber. Another method of forming the conducting elements 3 would be to bend the opposed terminal edges of a flat metal strip outwardly at an angle to form narrow flanges and thereafter bend opposite sides of the strip along its longitudinal center line towards one another to position said flanges at an angle of approximately 90° to one another. As shown in Fig. 3, the body 1 of the outlet member has integral flanges 1, 1' extending laterally from its rear portion for attachment to a wall or other support.

The continuous outlet is designed primarily to be fastened to the room wall in a convenient location. It is intended usually to be placed so as to extend horizontally, but obviously may be placed to extend vertically, or in any other necessary or desirable direction. It may be placed on or near the base trim of a room, or may be constructed integrally with one of the members of the base trim, for example the top member. The normally closed continuous resilient slits 2 disposed in spaced relation on the front face of the outlet member 1, are adapted to receive at any portion of their longitudinal extent, the usual spaced prongs of an electrical connector member indicated at 17 in Fig. 1. The flexible conducting cord 17a of the connector member leads to the utility device which is plugged into the outlet member 1, for example a lamp, vacuum cleaner or other electrically operated device.

Fig. 4 shows how the continuous outlet may be connected to the electrical supply system of the building. In this figure reference numeral 4 indicates the armored supply cable, which is or may be fastened to the body of a conventional outlet box 5, as by a clamp device 5a. The electrical conductor leads 6 of the cable may be attached by means of small screws 7 to U-shaped clamp pieces 8, which in turn may be affixed to the current conducting elements 3 of the continuous outlet in any convenient manner, such as by screw means 8'.

Alternatively, the outlet member 1 may be supplied with current from any convenient wall socket, as by means of a flexible cord connector equipped with a plug at each end.

Preferably the continuous member 1 is enclosed and protected by means of a plastic or other cover member 9 having longitudinally spaced slits or spaced openings 10 therein. Said openings register with slits 2 in the outlet member 1. This construction affords additional protection and finish for the continuous outlet. The cover member 9 and outlet body 1 are secured to the wall or other desired support by means of screws 11, or other fastening means. Obviously the closely spaced pairs of openings 10 disposed at intervals along the cover member 9, afford plug-in access to the outlet at substantially any desired point along the slits 2, of the continuous outlet member 1.

Figs. 5 and 7 show the manner in which the contact or current conducting elements are joined in the corner of a room. Fig. 7 shows an angular junction piece or member 12, one leg of which is fixed to a current conducting element 3 (Fig. 4), by means of a screw 13. The current conducting element 3 in the outlet member 1 on the abutting wall at the corner is connected to the other leg of the junction piece in a similar manner. If the outlet member extends around an "outside" corner, as at a jutting flue or fireplace, the angled junction piece 12 is in reversed position, as will be obvious.

Other means for connecting the conducting elements or members 3 at corners may be used without departing from the spirit of the basic invention. Flexible insulated pieces, such as large gauge wires, may have their ends soldered or otherwise secured to the corresponding ends of elements 3 for the same purpose.

When the conducting elements 3 are supplied with current from the box 5, a box cover plate 14 (Figs. 2 and 4) is secured to the face of the box 5 by means of screws 15, which enter properly located and threaded holes in said box face. This cover plate 14 serves to conceal and protect the described current conducting portions of the assembly which would otherwise be exposed after their connection as previously described.

As shown in Fig. 5, cover plate members 14a, 14a may be cut at a properly meeting angle 16 and applied to the corner assembly as shown. In employing this expedient to protect an "outside" corner assembly, the angular cuts would be reversed, as will be apparent.

In making the connections shown in Figs. 4 and 5, portions of the yielding body 1 of the continuous outlet are removed, thus exposing the ends of the current conducting elements 3, so as to make them accessible for making connections. The exposed metal parts of these connections may be insulated as required, after which the cover plates 14 are applied to complete the protection and finish.

After the installation of the continuous outlet member assembly, the pronged contact plug 17 may be inserted as shown in Fig. 1 into a desired pair of slits 10 to supply current to a fixture wherever desired and in accordance with the length of the flexible cord 17a leading to said fixture.

One of the very important features of this improved outlet member 1 is the normal close contact between the walls of the resilient slits 2 at their outer edges, as shown in Figs. 1 and 3. This close contact is temporarily separated only when and where the prongs of a plug 17 are inserted to make contact with the conducting elements 3. This feature distinguishes my continuous contact outlet member from those now known or distributed in the trade.

It will be understood that the protective cover plate member 9 having the longitudinally spaced pairs of prong receiving apertures 10 therein, is preferably constructed of plastic or other insulating material.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What I claim is:

1. A continuous electrical outlet, comprising an elongated yieldable body member of insulating material having spaced continuous normally closed slits on one surface thereof, spaced elongated electrical contact elements embedded in said body member and closely engaging the insulating material of the latter throughout their longitudinal extent, said contact elements being resilient and of substantial U-shape and registering at their forward open ends with said normally closed body member slits, integral flanges extending laterally from the rear of said body member for attaching the same to a wall support, and a continuous electrically insulated cover member substantially conforming to the configuration of said body member for enclosing and concealing the latter and its said flanges, an exposed surface of said cover member having spaced openings disposed in registry with said body member slits for receiving therethrough the prongs of a detachable electric plug element to expand the yieldable walls of said body member slits and for engaging the open ends of said resilient contact elements.

2. A continuous electrical outlet as defined in claim 1, wherein said U-shaped electrical contact elements terminate in longitudinal projections disposed substantially at right angles to one another for receiving therebetween the prongs of said detachable electric plug element.

RUDYARD K. WELLMAN.

References Cited in the file of this patent

UNITED STATES PATENTS

| Number | Name | Date |
| --- | --- | --- |
| 1,958,993 | Friend | May 15, 1934 |
| 1,988,627 | MacLellan | Jan. 22, 1935 |
| 2,175,245 | Brockman | Oct. 10, 1939 |
| 2,190,196 | Semenyna | Feb. 13, 1940 |
| 2,230,658 | Stull | Feb. 4, 1941 |
| 2,234,745 | Von Rarrel | Mar. 11, 1941 |
| 2,283,398 | Van Deventer | May 19, 1942 |
| 2,284,097 | La Jone | May 26, 1942 |